(12) United States Patent
Bian (10) Patent No.: US 11,467,341 B2
(45) Date of Patent: Oct. 11, 2022

(54) WAVEGUIDE CROSSINGS INCLUDING A SEGMENTED WAVEGUIDE SECTION

(71) Applicant: GLOBALFOUNDRIES U.S. Inc., Santa Clara, CA (US)

(72) Inventor: Yusheng Bian, Ballston Lake, NY (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 71 days.

(21) Appl. No.: 17/094,105

(22) Filed: Nov. 10, 2020

(65) Prior Publication Data

US 2022/0146748 A1     May 12, 2022

(51) Int. Cl.
| | | |
|---|---|---|
| G02B 6/125 | (2006.01) | |
| G02B 6/02 | (2006.01) | |
| G02B 6/28 | (2006.01) | |
| G02B 6/122 | (2006.01) | |

(52) U.S. Cl.
CPC ......... *G02B 6/125* (2013.01); *G02B 6/02338* (2013.01); *G02B 6/1228* (2013.01); *G02B 6/2813* (2013.01)

(58) Field of Classification Search
CPC ..................................................... G02B 6/125
See application file for complete search history.

(56) References Cited

U.S. PATENT DOCUMENTS

| | | | | |
|---|---|---|---|---|
| 5,619,369 A | * | 4/1997 | Yamamoto | G02B 6/124 359/332 |
| 5,703,710 A | * | 12/1997 | Brinkman | G02F 1/03 359/251 |
| 6,438,298 B1 | * | 8/2002 | Matsui | G02B 6/2852 345/55 |
| 9,709,738 B1 | | 7/2017 | Dumais | |
| 10,365,425 B1 | * | 7/2019 | Héroux | G02B 6/138 |
| 10,718,903 B1 | | 7/2020 | Bian et al. | |
| 10,816,725 B2 | | 10/2020 | Bian et al. | |
| 2004/0258361 A1 | * | 12/2004 | Telkamp | G02B 6/136 385/39 |
| 2005/0213873 A1 | | 9/2005 | Piede et al. | |
| 2006/0204175 A1 | * | 9/2006 | Laurent-Lund | G02B 6/305 385/129 |
| 2010/0329601 A1 | * | 12/2010 | Ide | G02B 6/125 385/3 |

(Continued)

OTHER PUBLICATIONS

Jacob et al., "Waveguide Crossings Having Arms Shaped With a Non-Linear Curvature", filed Oct. 25, 2019 as U.S. Appl. No. 16/663,696.

(Continued)

*Primary Examiner* — Eric Wong
(74) *Attorney, Agent, or Firm* — Thompson Hine LLP; Francois Pagette (57) ABSTRACT

Structures with waveguide cores in multiple levels and methods of fabricating a structure that includes waveguide cores in multiple levels. The structure includes a first waveguide core and a second waveguide core positioned in a different level than the first waveguide core. The first waveguide core includes a longitudinal axis and a plurality of segments having a spaced arrangement along the longitudinal axis. The second waveguide core is aligned to extend across the plurality of segments of the first waveguide core.

20 Claims, 8 Drawing Sheets

(56) References Cited

U.S. PATENT DOCUMENTS

| | | | | |
|---|---|---|---|---|
| 2011/0182548 | A1* | 7/2011 | Kopp | G02B 6/305 385/37 |
| 2013/0108208 | A1 | 5/2013 | Doerr | |
| 2015/0016794 | A1* | 1/2015 | Mori | G02B 6/028 385/124 |
| 2017/0017039 | A1* | 1/2017 | Tu | G02B 6/12002 |
| 2017/0254951 | A1* | 9/2017 | Dumais | G02B 6/136 |
| 2017/0317471 | A1* | 11/2017 | Lor | G02B 6/124 |
| 2018/0364426 | A1* | 12/2018 | ten Have | G02B 6/4214 |
| 2020/0150347 | A1* | 5/2020 | Paquet | G02B 6/0238 |

OTHER PUBLICATIONS

Kuanping Shang, et al., "Low-loss compact multilayer silicon nitride platform for 3D photonic integrated circuits," Opt Express 23, 21334-21342 (2015).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

Adam M. Jones, et al., "Ultra-low crosstalk, CMOS compatible waveguide crossings for densely integrated photonic interconnection networks," Opt. Express 21, 12002-12013 (2013).

Wesley D. Sacher, et al., "Tri-layer silicon nitride-on-silicon photonic platform for ultra-low-loss crossings and interlayer transitions," Opt. Express 25, 30862-30875 (2017).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Przemek J. Bock, et al., "Subwavelength grating crossings for silicon wire waveguides," Opt. Express 18, 16146-16155 (2010).

Bian et al., "Towards low-loss monolithic silicon and nitride photonic building blocks in state-of-the-art 300mm CMOS Foundry", OSA Frontiers in Optics/Laser Science, FTu6E.3 (2020).

Mu, X.; Wu, S.; Cheng, L.; Fu, H., "Edge Couplers in Silicon Photonic Integrated Circuits: A Review", Published Feb. 24, 2020, Appl. Sci. 10, 1538.

* cited by examiner

Figure 1:
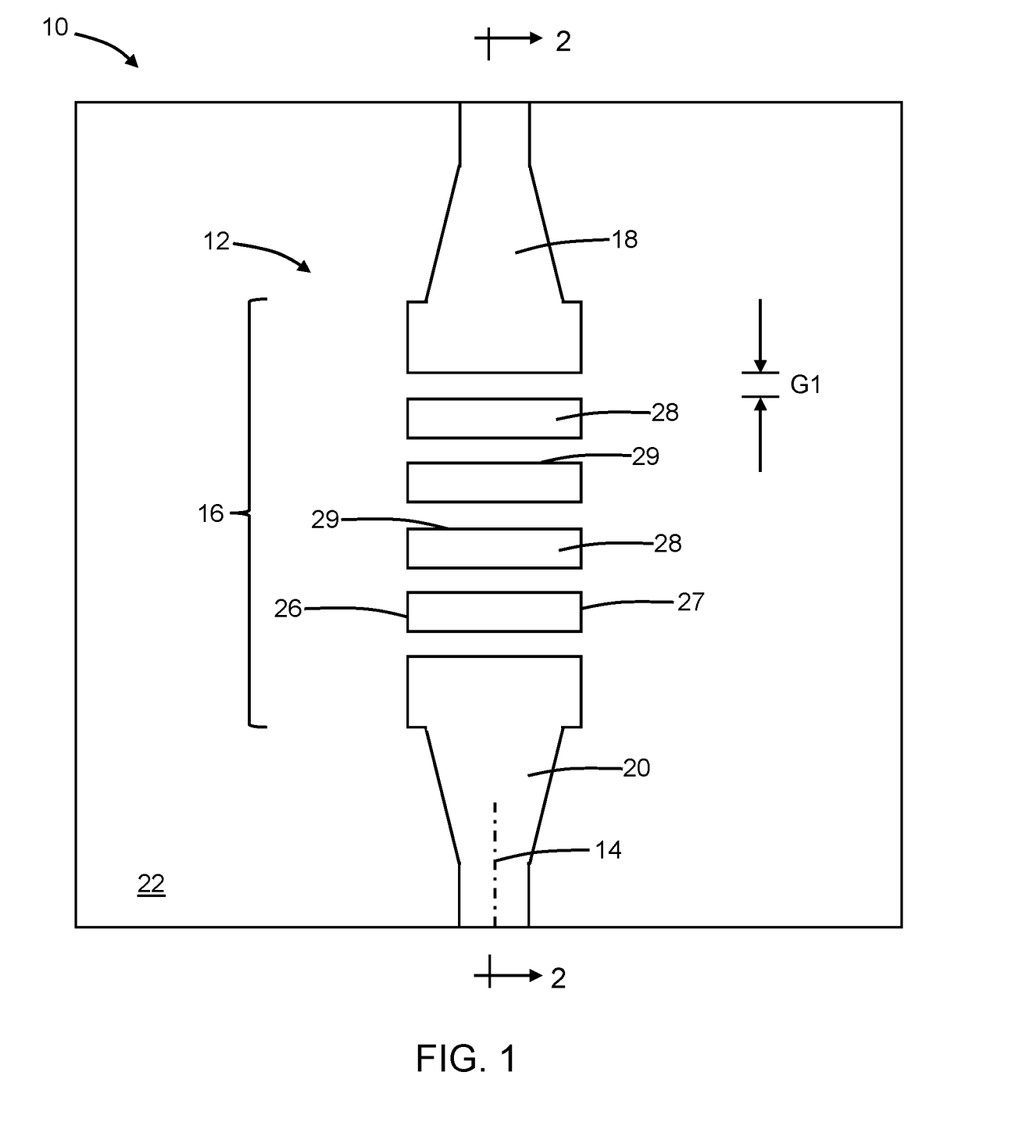
FIG. 1 is a top view of a structure at an initial fabrication stage of a processing method in accordance with embodiments of the invention.
Figure 2:
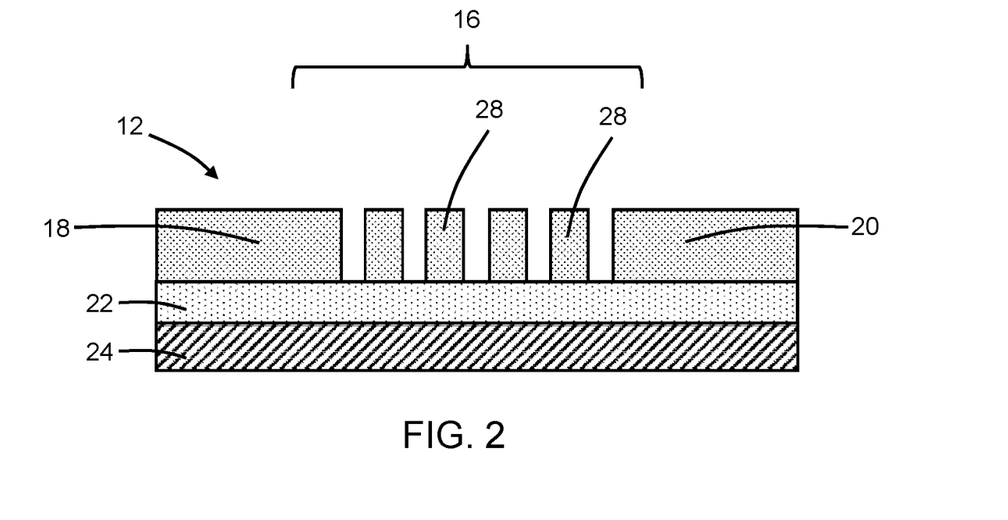
FIG. 2 is a cross-sectional view taken generally along line 2-2 in FIG. 1.

FIG. 9 ial axis 14. The waveguide core 12 may include a
central section 16 and tapered sections 18, 20 that respectively adjoin opposite ends of the central section 16. The central section 16 is arranged along the longitudinal axis 14 between the tapered section 18 and the tapered section 20. The central section 16 may be wider than either the tapered section 18 or the tapered section 20. In that regard, the tapered sections 18, 20 each longitudinally taper (i.e., narrow in width) with increasing distance from the central section 16.

WAVEGUIDE CROSSINGS INCLUDING A SEGMENTED WAVEGUIDE SECTION

BACKGROUND

The present invention relates to photonics chips and, more specifically, to structures with waveguide cores in multiple levels and methods of fabricating a structure that includes waveguide cores in multiple levels.

Photonics chips are used in many applications and systems, such as data communication systems and data computation systems. A photonics chip integrates optical components, such as waveguides, optical switches, and optical couplers, and electronic components, such as field-effect transistors, into a unified platform. Among other factors, layout area, cost, and operational overhead may be reduced by the integration of both types of components.

Waveguide cores may be arranged in multiple levels on a photonics chip. For example, a waveguide core may be formed in a lower level by patterning a layer of material, and a waveguide core may be formed in an upper level by patterning another layer. In the layout of the photonics chip, the waveguide core in the upper level may be routed over and across the waveguide core in the lower level. Such direct crossings of waveguide cores may result in significant insertion loss and high cross-talk due to strong light scattering induced by the close local proximity of the waveguide cores in the different levels.

Improved structures with waveguide cores in multiple levels and methods of fabricating a structure that includes waveguide cores in multiple levels are needed.

SUMMARY

In an embodiment of the invention, a structure includes a first waveguide core and a second waveguide core positioned in a different level than the first waveguide core. The first waveguide core includes a longitudinal axis and a plurality of segments having a spaced arrangement along the longitudinal axis. The second waveguide core is aligned to extend across the plurality of segments of the first waveguide core.

In an embodiment of the invention, a method includes forming a first waveguide core including a longitudinal axis and a plurality of segments having a spaced arrangement along the longitudinal axis. The method further includes forming a second waveguide core that is positioned in a different level than the first waveguide core and that is aligned to extend across the plurality of segments of the first waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

With reference to FIGS. 1, 2 and in accordance with embodiments of the invention, a structure 10 includes a waveguide core 12 that extends lengthwise along a longitud- The waveguide core 12 may be arranged over a dielectric layer 22. In an embodiment, the dielectric layer 22 may be comprised of silicon dioxide. In an embodiment, the dielectric layer 22 may be a buried oxide layer of a silicon-on-insulator substrate, and the silicon-on-insulator substrate may further include a handle substrate 24 comprised of a single-crystal semiconductor material, such as single-crystal silicon. The waveguide core 12 may be comprised of a single-crystal semiconductor material, such as single-crystal silicon, that may contain a finite number of crystalline defects. In an embodiment, the waveguide core 12 may be patterned by lithography and etching processes from a single-crystal silicon device layer of a silicon-on-insulator substrate. The device layer may be fully etched to define the waveguide core 12 or, alternatively, only partially etched to define a thinned residual layer on the dielectric layer 22 and coupled to a lower portion of the waveguide core 12.

A portion of the central section 16 of the waveguide core 12 may be divided into multiple grating features or segments 28 that are laterally spaced and arranged along the longitudinal axis 14 with a given pitch and separated by gaps, G1. The spaced arrangement for the segments 28 may be defined during the lithography and etching processes forming the waveguide core 12. The segments 28 have side surfaces or sidewalls 29 that border opposite sides of the gaps, G1, and that are oriented transverse to the longitudinal axis 14. In an embodiment, the pitch and duty cycle of the segments 28 may be uniform. In alternative embodiments, the pitch and/or the duty cycle of the segments 28 may be apodized (i.e., non-uniform).

The central section 16 has opposite side surfaces or sidewalls 26, 27, and the portion of the sidewalls 26, 27 belonging to the segments 28 may be connected by the sidewalls 29. In the representative embodiment, the opposite sidewalls 26, 27 may be separated by a constant distance over the length of the central section 16 and, for that reason, the width dimensions of the segments 28 may be constant over the length of the central section 16. In alternative embodiments, the segments 28 may have a geometrical shape that is different than the representative rectangular geometrical shape. In alternative embodiments, the segments 28 may have width dimensions that vary over the length of the central section 16. In alternative embodiments, the sidewalls 26, 27 of the segments 28 may be curved, and the sidewalls 29 of the segments 28 oriented normal to the longitudinal axis 14 may be planar or substantially planar. In alternative embodiments, the sidewalls 26, 27 of the segments 28 may be tapered with a curvature defined by a non-linear function, such as a quadratic, parabolic, or exponential function.

The segments 28 of the waveguide core 12 may be characterized by optical properties (e.g., refractive index) that differ from bulk optical properties, commonly referred to as a metamaterial. In an embodiment, the pitch of the segments 28 may be less than the wavelength of the laser light being guided by the waveguide core 12.

Figure 3:
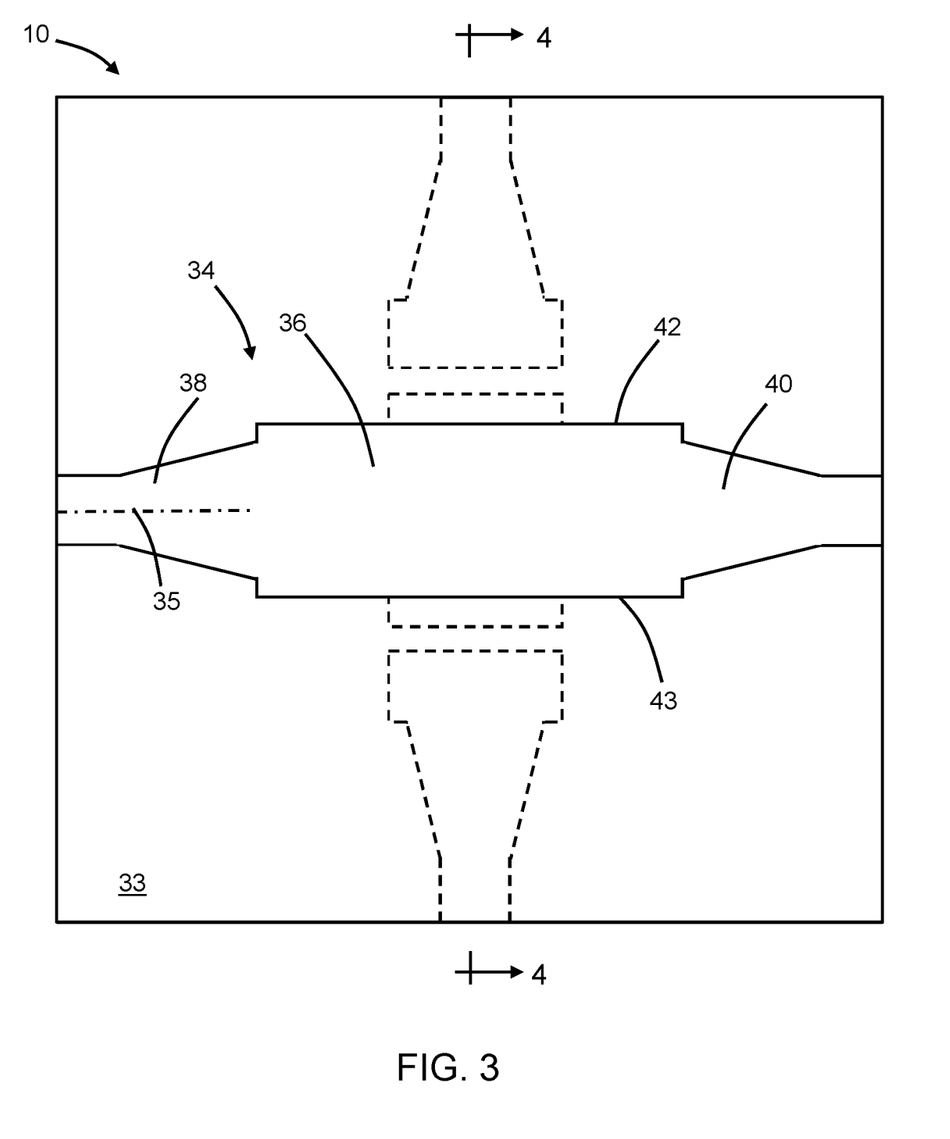
FIG. 3 is a top view of the structure at a fabrication stage of the processing method subsequent to FIG. 1.
Figure 4:
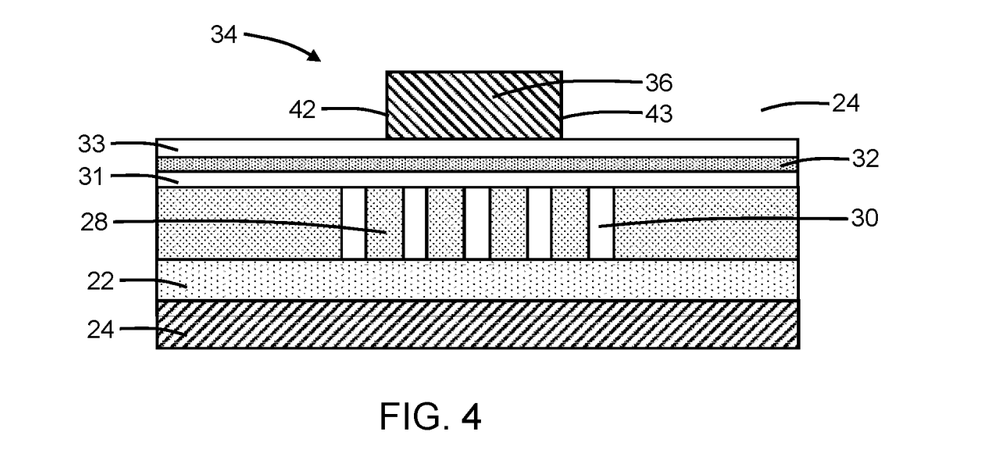
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 30 is formed that fills the space surrounding the waveguide core 12 and that fills the gaps, G1, arranged longitudinally between the segments 28. The dielectric layer 30 may be comprised of a dielectric material, such as silicon dioxide, deposited by chemical vapor deposition and planarized by, for example, chemical mechanical polishing to remove topography. The dielectric material of the dielectric layer 30, which has a lower refractive index than the waveguide core 12, reduces the effective refractive index of the segmented central section 16 of the waveguide core 12. Additional dielectric layers 31, 32, 33 may be formed over the dielectric layer 30 and may be respectively comprised of silicon dioxide, silicon nitride, and silicon dioxide. In an alternative embodiment, the dielectric layer 32 containing silicon nitride may be omitted.

A waveguide core 34 is formed on the dielectric layer 33. The waveguide core 34 and the waveguide core 12 are positioned in different layers or levels of the structure 10. Specifically, the waveguide core 34 is located in a level or layer that is positioned in a vertical direction within a different plane from (i.e., over and above) the level or layer of the waveguide core 12. The waveguide core 34 may be formed by depositing a layer of its constituent material on the dielectric layer 34 and patterning the deposited layer with lithography and etching processes. In an embodiment, the waveguide core 34 is comprised of a material having a different composition than the material contained in the waveguide core 12. In an embodiment, the waveguide core 34 may be comprised of silicon nitride. The deposited layer may be fully etched to define the waveguide core 34 or, alternatively, only partially etched to define a thinned residual layer on the dielectric layer 33 and coupled to a lower portion of the waveguide core 34.

The waveguide core 34 extends lengthwise along a longitudinal axis 35 and across the waveguide core 12 in a level above the level of the waveguide core 12. The waveguide core 34 may include a central section 36 and tapered sections 38, 40 that respectively adjoin opposite ends of the central section 36. The central section 36 may be wider than either the tapered section 38 or the tapered section 40. The central section 36 is arranged along the longitudinal axis 35 between the tapered section 38 and the tapered section 40. The tapered sections 38, 40 each longitudinally taper (i.e., narrow in width) with increasing distance from the central section 36. The central section 36 has opposite sidewalls 42, 43.

The longitudinal axis 35 of the waveguide core 34 is aligned relative to the longitudinal axis 14 of the waveguide core 12 such that the waveguide core 34 crosses over the waveguide core 12. Specifically, a portion of the central section 36 of the waveguide core 34 overlaps with a portion of the central section 16 of the waveguide core 12. More specifically, a portion of the central section 36 of the waveguide core 34 overlaps with some or all of the segments 28 of the central section 16 of the waveguide core 12. In an embodiment, the waveguide core 34 may be aligned transverse to the waveguide core 12. In an embodiment, the waveguide core 34 may be aligned perpendicularly to the waveguide core 12.

The incorporation of the segments 28 in the waveguide core 12 and the filling of the gaps between segments 28 by a lower-index material of the dielectric layer 30 may be effective to mitigate the perturbing effect of the waveguide core 12 upon an optical signal propagating in the central section 36 of the waveguide core 34 across the central section 16 of the waveguide core 12.

In alternative embodiments, the waveguide core 12 and the waveguide core 34 may be formed from a different set of materials. In an embodiment, the waveguide core 12 may be comprised of single-crystal silicon, and the waveguide core 34 may be comprised of polysilicon. In an embodiment, the waveguide core 12 may be comprised of single-crystal silicon, and the waveguide core 34 may be comprised of silicon oxynitride. In an embodiment, the waveguide core 12 may be comprised of silicon nitride, and the waveguide core 34 may be comprised of silicon oxynitride. In an embodiment, the waveguide core 12 may be comprised of silicon oxynitride, and the waveguide core 34 may be comprised of silicon nitride.

Figure 5:
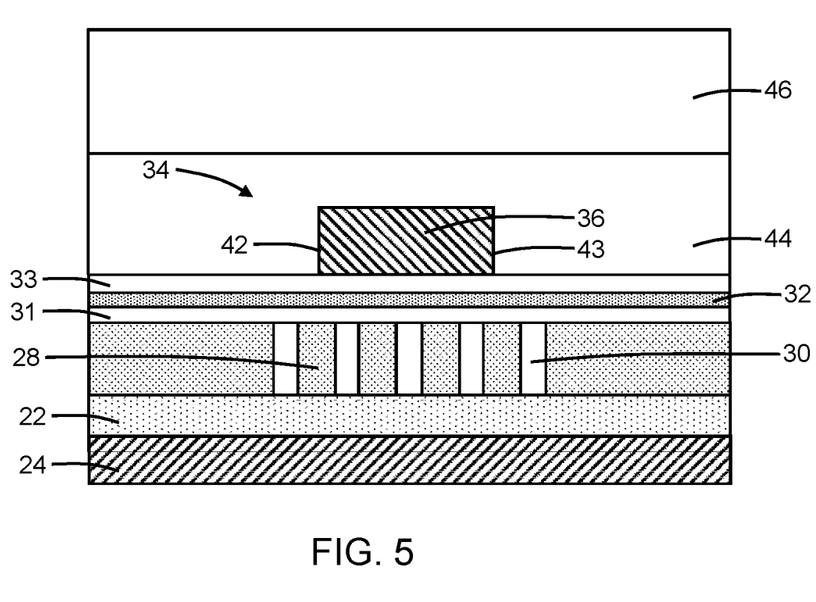
FIG. 5 is a cross-sectional view of the structure at a fabrication stage of the processing method subsequent to FIG. 4.

With reference to FIG. 5 in which like reference numerals refer to like features in FIG. 4 and at a subsequent fabrication stage, a dielectric layer 44 is formed over and about the waveguide core 34 and dielectric layer 33. The dielectric layer 44 may be comprised of a dielectric material, such as silicon dioxide, deposited by chemical vapor deposition and planarized by, for example, chemical mechanical polishing to remove topography. The dielectric material of the dielectric layer 44 provides a low-index cladding for the waveguide core 34.

A back-end-of-line stack 46 is formed over the dielectric layer 44. The back-end-of-line stack 46 includes one or more dielectric layers that may be comprised of dielectric material, such as silicon dioxide.

The structure 10, in any of its embodiments described herein, may be integrated into a photonics chip that includes electronic components and additional optical components. For example, the electronic components may include field-effect transistors that are fabricated by CMOS processing.

Figure 6:
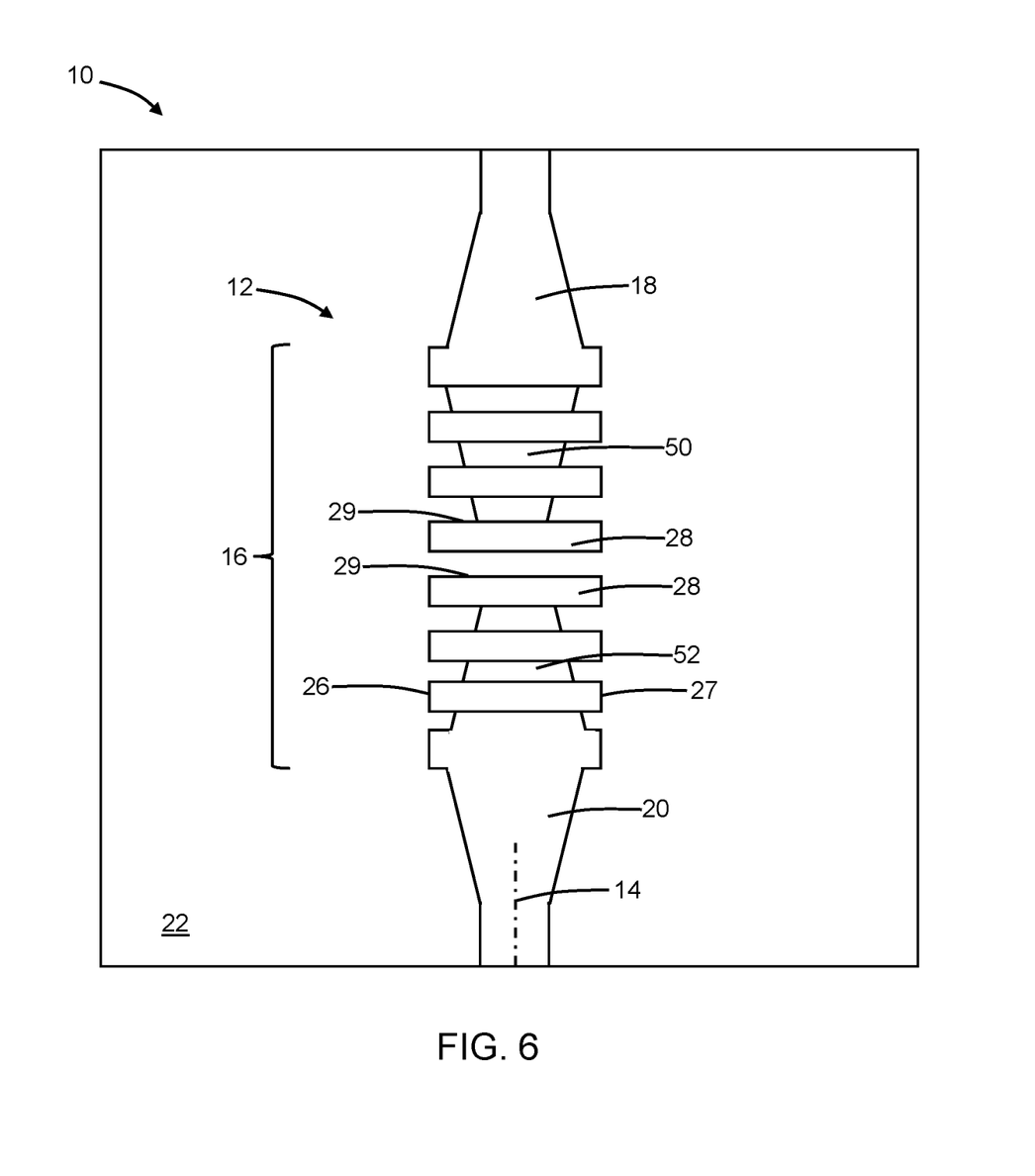
FIG. 6 is a top view of a structure in accordance with alternative embodiments of the invention.

With reference to FIG. 6 in which like reference numerals refer to like features in FIG. 1 and in accordance with alternative embodiments of the invention, tapered sections 50, 52 may be added to the central section 16. The tapered sections 50, 52, which are aligned along the longitudinal axis 14, are overlaid with segments 28 of the central section 16. The tapered section 50 is adjoined to the tapered section 18 and longitudinally positioned between the segments 28 and the tapered section 18. The tapered section 52 is adjoined to the tapered section 20 and longitudinally positioned between the segments 28 and the tapered section 20.

The tapered sections 50, 52 each decrease in width dimension with increasing distance from the tapered sections 18, 20.

Figure 7:
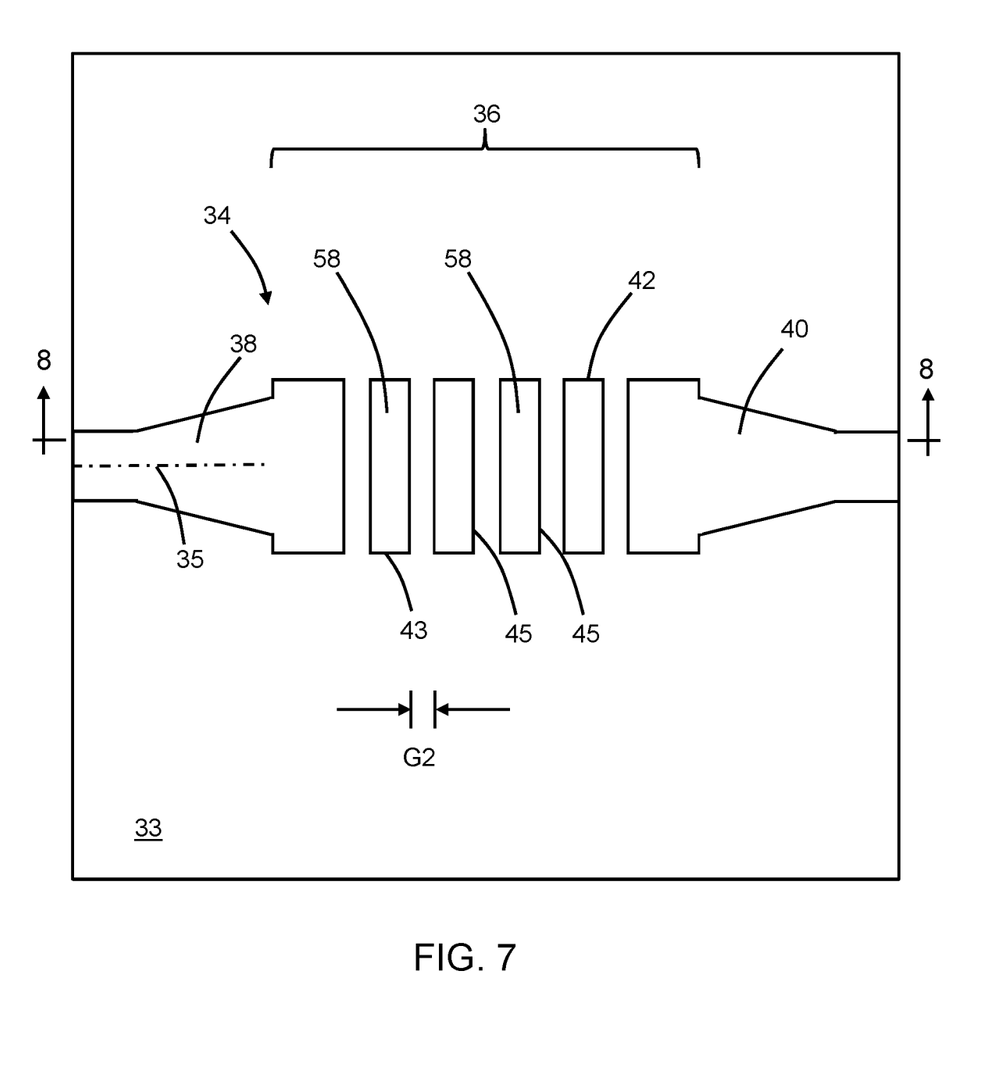
FIG. 7 is a top view of a structure in accordance with alternative embodiments of the invention.
Figure 8:
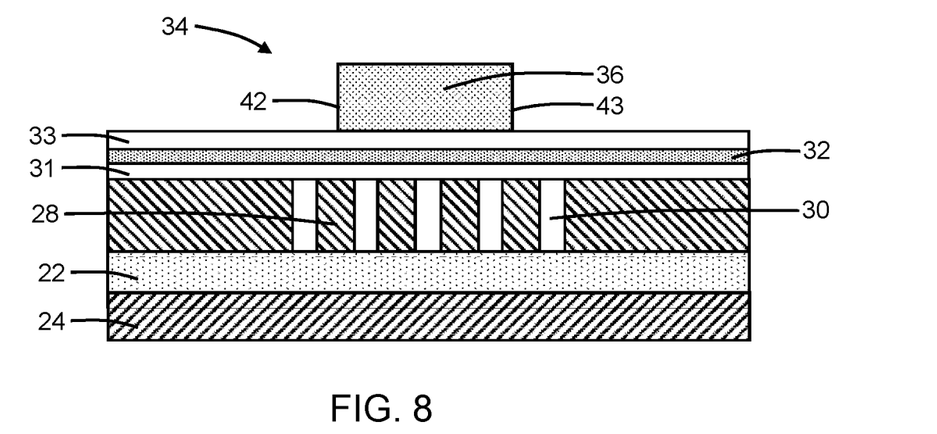
FIG. 8 is a cross-sectional view taken generally along line 8-8 in FIG. 7.

With reference to FIGS. 7, 8 in which like reference numerals refer to like features in FIG. 3 and in accordance with alternative embodiments of the invention, a portion of the central section 36 of the waveguide core 34 may be divided into multiple grating features or segments 58 that are laterally spaced and arranged along the longitudinal axis 35 with a given pitch and separated by gaps, G2. The spaced arrangement for the segments 58 may be defined during the lithography and etching processes forming the waveguide core 34. The dielectric material of the dielectric layer 44 fills the gaps, G2, between the segments 58, which reduces the effective refractive index of the central section 36 of the waveguide core 34. The segments 58 have side surfaces or sidewalls 45 that border opposite sides of the gaps, G2, and that are oriented transverse to the longitudinal axis 35. The opposite sidewalls 42, 43 of the segments 58 may be connected by the sidewalls 45. In an embodiment, the pitch and duty cycle of the segments 58 may be uniform. In alternative embodiments, the pitch and/or the duty cycle of the segments 58 may be apodized (i.e., non-uniform).

In the representative embodiment, the opposite sidewalls 42, 43 may be separated by a constant distance over the length of the central section 36 and, for that reason, the segments 58 may have a constant width dimension over the length of the central section 36. In alternative embodiments, the segments 58 may have a different geometrical shape than the representative rectangular geometrical shape. In alternative embodiments, the segments 58 may have width dimensions that vary over the length of the central section 36. In alternative embodiments, the sidewalls 42, 43 of the segments 58 may be curved, and the sidewalls 45 of the segments 58 oriented normal to the longitudinal axis 35 may be planar or substantially planar. In alternative embodiments, the sidewalls 42, 43 of the segments 58 may be tapered with a curvature defined by a non-linear function, such as a quadratic, parabolic, or exponential function.

The segments 58 of the waveguide core 34 may be characterized by optical properties (e.g., refractive index) that differ from bulk optical properties, commonly referred to as a metamaterial. In an embodiment, the pitch of the segments 58 may be less than the wavelength of the laser light being guided by the waveguide core 34.

In an embodiment, the segments 58 of the waveguide core 34 may be arranged over the segments 28 of the waveguide core 12. Some of the segments 58 of the waveguide core 34 may overlap with some of the segments 28 of the waveguide core 12, and the segments 58 of the waveguide core 34 may be aligned transverse to the segments 28 of the waveguide core 12. In an alternative embodiment, the waveguide core 12 may lack the segments 28 such that the segments 58 are located over a central section 16 of the waveguide core 12 that is unitary and not segmented.

Figure 9:
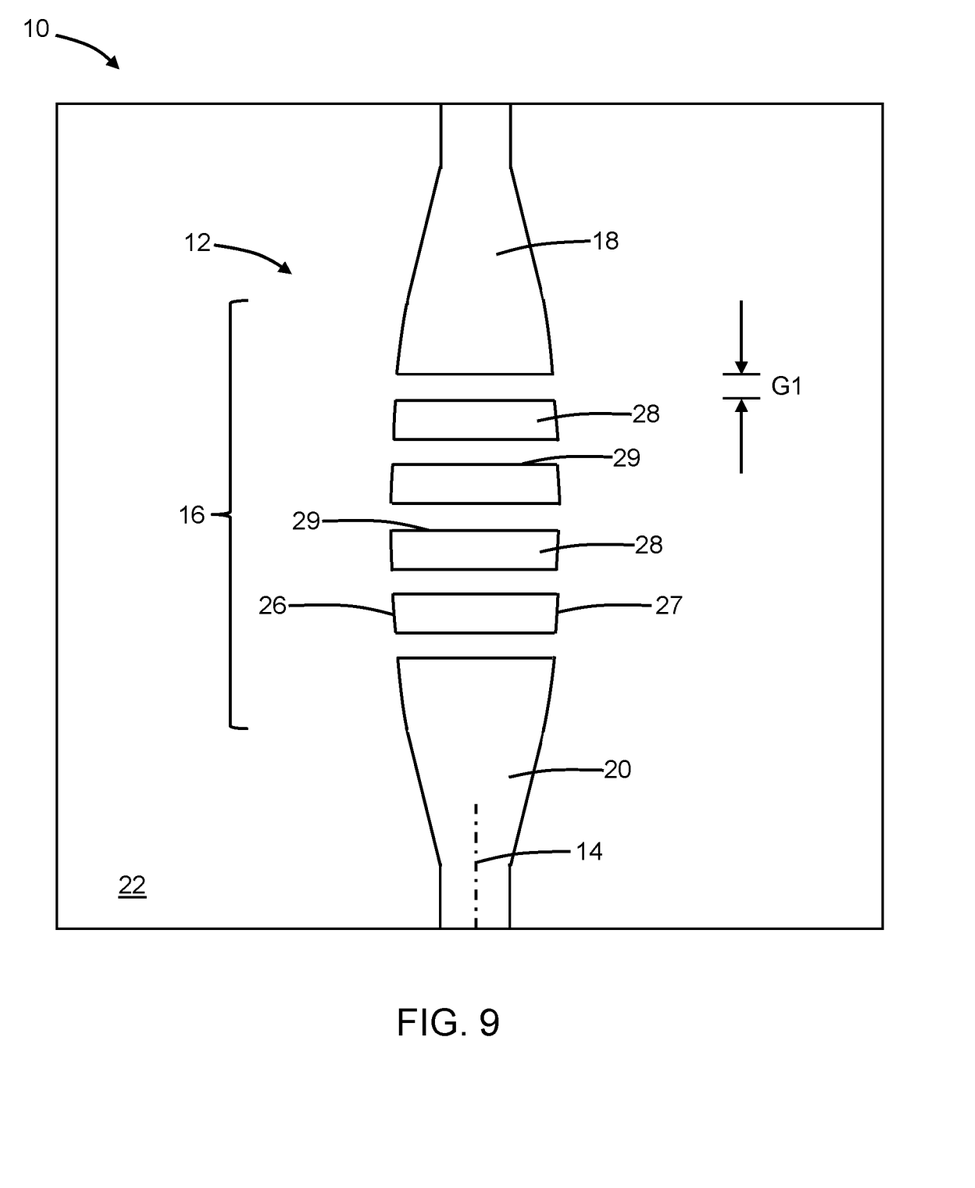
FIG. 9 is a top view of a structure in accordance with alternative embodiments of the invention.

With reference to FIG. 9 in which like reference numerals refer to like features in FIG. 1 and in accordance with alternative embodiments of the invention, the central section 16 of the waveguide core 12, including the segments 28, may have a width dimension between the sidewalls 26, 27 that varies based on a non-linear function, such as a quadratic, parabolic, or exponential function. The non-linear variation in the width dimension results in a curvature of the sidewalls 26, 27. The segments 28 adopt the varying width dimension and curved shape such that the segments 28 with the smallest width may be located adjacent to the tapered sections 18, 20, and the segments 28 with the largest width may be located below the central section 36 of the waveguide core 34.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first waveguide core including a first longitudinal axis, a first tapered section, a second tapered section, and a first plurality of segments having a first spaced arrangement along the first longitudinal axis between the first tapered section and the second tapered section; and
a second waveguide core positioned in a different level than the first waveguide core, the second waveguide core aligned transverse to the first waveguide core so as to extend across the first plurality of segments of the first waveguide core.

2. The structure of claim 1 wherein the second waveguide core is positioned above the first waveguide core.

3. The structure of claim 2 wherein the first waveguide core comprises a first material, and the second waveguide core comprises a second material having a different composition than the first material.

4. The structure of claim 2 wherein the first waveguide core comprises single-crystal silicon, and the second waveguide core comprises silicon nitride.

5. The structure of claim 1 wherein the second waveguide core is positioned below the first waveguide core.

6. The structure of claim 5 wherein the first waveguide core comprises a first material, and the second waveguide core comprises a second material having a different composition than the first material.

7. The structure of claim 5 wherein the first waveguide core comprises silicon nitride, and the second waveguide core comprises single-crystal silicon.

8. The structure of claim 1 further comprising:
a dielectric layer positioned between the first waveguide core and the second waveguide core.

9. The structure of claim 1 wherein the second waveguide core includes a second longitudinal axis and a second plurality of segments having a second spaced arrangement along the second longitudinal axis.

10. The structure of claim 9 wherein the first plurality of segments are aligned transverse to the second plurality of segments.

11. The structure of claim 1 wherein the first plurality of segments define opposite sidewalls that are tapered with a curvature defined by a non-linear function.

12. The structure of claim 1 wherein the first plurality of segments are separated by a plurality of gaps, and further comprising:
a dielectric layer including portions positioned in the plurality of gaps.

13. The structure of claim 1 wherein the first waveguide core includes a taper that is overlaid with the first plurality of segments.

14. The structure of claim 1 wherein the first plurality of segments have a width dimension that varies based on a non-linear function.

15. A method comprising:
forming a first waveguide core including a first longitudinal axis, a first tapered section, a second tapered section, and a first plurality of segments having a first spaced arrangement along the first longitudinal between the first tapered section and the second tapered section; and forming a second waveguide core that is positioned in a different level than the first waveguide core and that is aligned transverse to the first waveguide core so as to extend across the first plurality of segments of the first waveguide core.

16. The method of claim 15 wherein the second waveguide core is positioned above the first waveguide core, the first waveguide core comprises a first material, and the second waveguide core comprises a second material having a different composition than the first material.

17. The method of claim 15 wherein the second waveguide core is positioned below the first waveguide core, the first waveguide core comprises a first material, and the second waveguide core comprises a second material having a different composition than the first material.

18. The method of claim 15 wherein the second waveguide core includes a second longitudinal axis and a second plurality of segments having a second spaced arrangement along the second longitudinal axis, and the first plurality of segments are aligned transverse to the second plurality of segments.

19. The structure of claim 12 wherein the first plurality of segments comprise a metamaterial.

20. The structure of claim 1 wherein the first plurality of segments are arranged in the first spaced arrangement with a pitch along the first longitudinal axis that is less than a wavelength of laser light being guided by the first waveguide core.

* * * * *